United States Patent Office 2,917,462
Patented Dec. 15, 1959

2,917,462

BORON-CARBON FEED STOCK

Chester L. Arnold, Berkeley, and Lars C. Bratt, Walnut Creek, Calif., assignors to Stauffer Chemical Company, a corporation of California No Drawing. Application April 27, 1956
Serial No. 581,012

3 Claims. (Cl. 252—182)

This invention relates to a novel method of preparing a feed stock which may be used in the chlorination of boron-carbon mixtures to make boron trichloride.

For some time, it has been known that a mixture of a carbonaceous material, such as charcoal and a boron compound, could be chlorinated by heating the mixture to an elevated temperature and passing chlorine gas therethrough.

The process as practiced in the past has suffered from several defects. In modern reactors, such as moving bed reactors or fluidized bed reactors, a granular feed material is required in order to allow the chlorine or chlorine-containing gas to pass through the bed.

In the past, whenever granular feed for a packed bed reactor had to be produced, it was necessary either to use boric oxide as a boron source, since this compound wets the carbonaceous material and produces a granular feed upon sintering, or to use various types of binders which then had to be removed by high temperature devolatilization, before the granular feed could be chlorinated.

In accordance with the present invention, a granular feed material is prepared from the cheapest available boron compounds, namely borax and boric acid. In addition, the size of the granules can be easily adjusted as desired.

In accordance with the present invention, a feed stock suitable for use in the manufacture of boron trichloride is made by preparing a concentrated solution of a borate, preferably sodium pentaborate, impregnating a carbonaceous material with said solution, and then drying the carbon with a high content of sodium pentaborate until all water is removed.

In carrying out the present invention, any source of carbon may be used, such as petroleum coke, amorphous carbon, or wood charcoal. It is essential that the material be granulated to the desired size before it is placed in the borate solution.

Although it is preferred to prepare the borate solution using approximately equal parts of boric acid and borax decahydrate, either one of these substances may be used alone, or they may be used in varying proportions. However, there is considerable advantage to using equal parts boric acid and borax decahydrate since in this manner the extremely soluble sodium pentaborate is formed. In this manner, a solution holding more than 50% sodium pentaborate can be prepared. The amount of boron compound absorbed by the granular carbon depends greatly on the concentration of the solution used for impregnation. Only when using a concentrated pentaborate solution can the $B_2O_3$ content of the impregnated carbon be raised as high as 30% without causing surface incrustations. The amount of water used for dissolving the mixture of boric acid and decahydrate should be kept as low as possible in order not to reduce the amount of boron compounds absorbed by the carbon. In fact, if care is exercised, it is possible to produce a pentaborate solution merely by heating borax decahydrate with an equal amount of boric acid to approximately 212° F., without adding any water. The compounds dissolve in their own water of crystallization, forming a viscous pentaborate syrup.

If it is desired to raise the $B_2O_3$ content of the impregnated carbon even higher than is feasible with the procedure mentioned above, vacuum impregnation can be used. In this case, the granular carbonaceous material is enclosed in a steel vessel, which is then evacuated to a vacuum not less than 5 inches of mercury. Either before or after the evacuation the vessel and the carbon is heated to a temperature not less than the boiling point of the pentaborate syrup, or approximately 230° F. The valve to the vacuum pump is then closed and the hot pentaborate syrup is sucked into the evacuated vessel until the syrup covers the granular carbonaceous material. The pressure in the evacuated chamber is then gradually increased until atmospheric pressure is reached, forcing the pentaborate solution into the pores of the carbonaceous material. This material is then drained and dried as described above. In this manner, the $B_2O_3$ content of the impregnated feed can be raised to 33% without causing surface incrustations.

The temperature of pentaborate solution can be varied as desired, although it is obvious to those skilled in the art that it is desirable to maintain the solution at the temperature which corresponds to the greatest solubility of the pentaborate, i.e., approximately 230° F.

The following working example illustrates a preferred method of carrying out the process of the present invention:

*Example 1.*—One hundred pounds boric acid and 100 pounds borax decahydrate were mixed in the dry form. The mixture was added gradually under stirring to 25 pounds of hot water, giving a viscous pentaborate syrup. Granular, devolatilized charcoal was immersed in this syrup for sufficient time to achieve good penetration. The impregnated charcoal was then drained and dried at high temperature of the order of 500° C., giving a granular anhydrous material containing approximately 30% $B_2O_3$. This granular material was heated to 500–1000° C. in a vertical packed bed reactor. When chlorine was passed through this bed, $BCl_3$ was obtained in yields normally exceeding 70% of the chlorine charged to the reactor.

*Example 2.*—One hundred pounds boric acid and 100 pounds borax decahydrate were mixed in dry form. The mixture was added gradually under stirring to 25 pounds of hot water, giving a viscous pentaborate syrup.

Granular, devolatilized charcoal was placed in a steam jacketed vessel. The vessel was evacuated and simultaneously heated to about 230° F. When the pressure of the vessel was less than 5 in Hg abs., the valve to the vacuum pump was closed and the hot pentaborate solution was sucked into the vessel. When the charcoal granules were completely covered with liquid, the vessel was opened to the atmosphere, thereby forcing the pentaborate solution into the pores of the charcoal. The impregnated charcoal was then treated as described under Example 1. By such vacuum treatment, it was found the $B_2O_3$ content of the impregnated charcoal could be raised to 33% $B_2O_3$ without serious surface incrustation.

We claim:

1. The process of making a granular feed stock containing a boron compound and free carbon suitable for use in the preparation of boron trichloride by chlorination comprising: heating granular free carbon to a temperature of about 230° F. in the presence of a vacuum of not less than about 5 inches of mercury; contacting said carbon material with concentrated sodium pentaborate syrup maintained at a temperature of about 230° F.; allowing the pressure about said free carbon material to gradually increase whereby to force said pentaborate syrup into the pores of said free carbon material; separating the granular material so formed from the liquid; and drying the impregnated granules to produce an anhydrous granulated feed material.

2. The process of claim 1 wherein said sodium pentaborate syrup is prepared by heating a mixture of about equal portions of borax decahydrate and boric acid until said materials dissolve in their water of crystallization.

3. A granular free carbon containing material impregnated with at least about 30% $B_2O_3$ characterized by an absence of any substantial quantity of surface encrustations of said $B_2O_3$.

References Cited in the file of this patent

UNITED STATES PATENTS

| | | |
|---|---|---|
| 68,261 | Tiffany | Aug. 27, 1867 |
| 2,097,482 | Weber | Nov. 2, 1937 |
| 2,493,507 | Sutherland | Jan. 3, 1950 |
| 2,674,581 | Balcar et al. | Apr. 6, 1954 |
| 2,695,221 | Klugh et al. | Nov. 23, 1954 |

OTHER REFERENCES

Uber das Bortrichlorid, by Weber, pub. by Eidgenossischen Technischen Hochschule, Zurich (1934).